United States Patent [19]
Kurth et al.

[11] 3,875,099
[45] Apr. 1, 1975

[54] FREE RADICAL EMULSION POLYMERIZATION INVOLVING NOVEL INCREMENTAL ADDITION OF ACRYLIC MONOMERS TO PREPARE HIGH VISCOSITY, FREEZE-THAW STABLE DISPERSIONS

[75] Inventors: Hans-Joachim Kurth, Darmstadt; Hubert Rauch, Weiterstadt; Peter Rossberg, Seeheim Ueber Darmstadt; Wilhelm Elser, Graefenhausen, all of Germany

[73] Assignee: Rohm GmbH, Darmstadt, Germany

[22] Filed: June 4, 1973

[21] Appl. No.: 367,044

[30] Foreign Application Priority Data
June 12, 1972 Germany............................ 22285150

[52] U.S. Cl... 260/29.6 TA, 260/80 M, 260/29.6 H, 260/80.8
[51] Int. Cl............................ C08f 1/13, C08f 15/40
[58] Field of Search......... 260/29.6 TH, 80.8, 80 M, 260/29.6 TA

[56] References Cited
UNITED STATES PATENTS

| | | | |
|---|---|---|---|
| 2,868,752 | 1/1959 | Fortune | 260/29.6 TA |
| 3,202,638 | 8/1965 | Van Ess | 260/29.6 TA |
| 3,231,533 | 1/1966 | Eilbeck | 260/29.6 TA |
| 3,692,726 | 9/1972 | Oehmichen | 260/29.6 TA |
| 3,749,690 | 7/1973 | Pattello | 260/29.6 TA |
| 3,784,498 | 1/1974 | Ceska | 260/29.6 TA |

Primary Examiner—Harold D. Anderson
Assistant Examiner—Peter F. Kulkosky
Attorney, Agent, or Firm—Curtis, Morris & Safford

[57] ABSTRACT

Method for preparing dispersions of an acrylic copolymer containing 0.5 to 2.5 of an $\alpha, \beta$- unsaturated carboxylic acid, wherein good stability and high viscosity in the dispersion is achieved by a controlled introduction of the acid during the polymerization process, namely by introducing at least 70 percent of the acid to the process in a manner such that the acid portion is 3 to 15 percent by weight of all the monomers being concurrently added, such addition further beginning before more than 50 percent by weight of the non-acid monomers has been introduced and terminating before more than 90 percent by weight of the non-acid monomers has been introduced.

4 Claims, No Drawings

FREE RADICAL EMULSION POLYMERIZATION INVOLVING NOVEL INCREMENTAL ADDITION OF ACRYLIC MONOMERS TO PREPARE HIGH VISCOSITY, FREEZE-THAW STABLE DISPERSIONS

The present invention relates to a method for preparing high-viscosity, shear-stable, freeze-thaw stable, and electrolyte-stable dispersions of synthetic acrylic resins, which dispersions are adaptable to inclusion therein of high concentrations of pigment.

Dispersions with these properties can be prepared according to German Offenlegungsschrift (DOS) 1,570,312 by the polymerization of acrylic or methacrylic acid esters together with styrene in aqueous emulsion with the addition of a protective colloid during the polymerization. The content of styrene is of considerable importance: it influences the particle size and the viscosity and increases the stability of the dispersions. On the other hand, the presence of styrene has the disadvantage that films prepared from dispersions of this type tend to yellow. Also, the content of protective colloid increases the hydrophilicity of films prepared from such a dispersion. In many cases this can be disadvantageous to the water resistance of the films, for example to the wet-scour resistance of paints.

Dispersions which are prepared without a protective colloid and without a large styrene component are not satisfactory from the point of view of those properties of interest in technical uses. Above all, a satisfactory shear stability, i.e., a mechanical stability of the dispersions to the inclusion thereinto of pigments and fillers by stirring, is difficult to attain. This is particularly so if, in addition, a high viscosity largely independent of pH value and a high stability to freezing and to the addition of electrolytes are also required.

Tests have also shown that many properties of resin dispersions are dependent on the amount of carboxy groups included therein, and on the way in which such groups are included. This is true, above all, of the viscosity, the shear stability, and the resistance to freezing and electrolytes. In order to obtain a sufficiently high viscosity over a broad pH range, a certain minimum number of carboxy groups is necessary. However, this minimum may not be exceeded at will if the viscosity in the alkaline pH region is not to assume undesirably high values. On the other hand, a satisfactory shear stability is obtained only when the carboxy group content is clearly above the range which is optimum for the viscosity. An undesirable increase in viscosity can be avoided by the presence of a high styrene content, but this in turn leads to the above-described disadvantages of large amounts of styrene.

It has now been found that shear-stable high-viscosity dispersions having a relatively low carboxy group content can be prepared if the carboxy groups are present only in one portion of the polymer, but are present therein in a certain minimum concentration.

Processes in which monomers containing carboxy groups are combined with a portion of the total monomer to be polymerized and, as a result, are incorporated only in a portion of the resulting emulsion polymer, are known in the art.

Thus, according to DOS 1,905,256, resin dispersions containing coarse particles are prepared by a special process in which an unsaturated carboxylic acid is added to a polymerization batch before or after the other monomers. In such a process, the polymer tends strongly to coagulation, which is, indeed, even intentional in the process to a limited extent. Complete coagulation is avoided by very long polymerization times. The resulting dispersions are of low viscosity, have low shear stability, and give paint films having an unsatisfactory resistance to wet scouring.

According to DOS 1,520,533, an emulsion polymer containing substantial amounts of acrylonitrile is polymerized in a two-step process. In this process, an unsaturated carboxylic acid can be incorporated into the polymer in both polymerization steps in the same or in different amounts. In no case, however, is the addition of the acid limited to a certain period of time or to a certain maximum amount, as is true of the method of the present invention. Rather, one is directed in practice to use a relatively high carboxylic acid content. As a result, the prior art dispersions cannot be used at pH values above 8 since their viscosity is then too high and their stability is too low.

According to the process of DOS 1,921,744, an emulsion polymer of vinylidene chloride, an acrylic ester, and itaconic acid is prepared in a first stage. In a second polymerization stage, a small amount of an acrylic ester is polymerized in the absence of monomers containing carboxy groups. This process does not permit the addition of a relatively small amount of acid with a limited portion of the other monomers. In consequence, dispersions are obtained the viscosity of which increases rapidly in the alkaline region if they contain a great deal of acid, or the shear stability of which is small if they contain little acid.

DOS 1,745,484 also describes a two-stage emulsion polymerization process in which an acid monomer is, according to choice, added either in the first stage, the second stage, or in both stages. The process is carried out in every case in such a manner that a predominant amount of the acid monomer is added in the second polymerization stage. Dispersions are produced which thicken strongly on the addition of alkali and, therefore, can only be used in the neutral pH region. Further, the styrene content of such dispersions results in the disadvantages mentioned earlier herein.

All of the aforementioned processes are distinct from the process of the present invention — apart from the fact that they do not concern the preparation of typical acrylic resin dispersions but critically contain amounts of other monomers — either in that monomers containing a carboxy group are added in a relatively high overall concentration or in that the largest portion of the acid monomers is added either before the other monomers or is first added in the last polymerization stage. In these cases, dispersions are produced the viscosity of which increases extraordinarily rapidly at pH values above 8 – 9 or the stability of which is unsatisfactory.

The present invention is based on the discovery that dispersions of a carboxy group containing acrylic resin, which dispersions have both a high shear stability and a viscosity suitable for technical use in the alkaline region, can be prepared without the addition of styrene or a protective colloid only if:

a. the amount of unsaturated carboxylic acid in the total amount of the monomers to be polymerized is between 0.5 and 2.5 percent by weight;

b. at least 70 percent of the unsaturated carboxylic acid is added to the polymerization vessel in a manner such that the carboxylic acid portion added is at any given time between 3 and 15 percent by weight of the total amount of the monomers, including the acid, being concurrently added; and c. that portion or segment of the process in which the unsaturated carboxylic acid is added according to (b) above begins before more than 50 percent by weight of the total non-acid monomers has been added to the polymerization vessel and ends before more than 90 percent by weight of the total non-acid monomers has been added.

More specifically, the method described just above is used for the preparation of resin dispersions of polymers formed from 1. 90 to 100 percent of monomers comprising:
   a. 87.5 to 99.5 percent of at least one alkyl ester of acrylic acid or of methacrylic acid;
   b. 2.5 to 0.5 percent of at least one $\alpha,\beta$-ethylenically unsaturated mono- or di-carboxylic acid; and
2. 0 to 10 percent of at least one other vinyl or vinylidene monomer copolymerizable therewith, each of said percentages being by weight of the total mixture of monomers to be polymerized. Such copolymers are prepared by an aqueous emulsion polymerization in the presence of a free radical initiator and an anionic or non-ionic emulsifier. In the process, the monomers may be added to the polymerization vessel per se or in emulsified form: the unsaturated carboxylic acid is added according to provisions (a) – (c) mentioned above. During or after the polymerization, a further non-ionic emulsifier is added.

As alkyl esters of acrylic acid and of methacrylic acid, those having up to 10 carbon atoms in the alkyl group, e.g., the methyl, ethyl, n-propyl, isopropyl, n-butyl, isobutyl, or 2-ethylhexyl esters, are of principal interest. These esters are known to produce homopolymers of varying degrees of hardness and are used alone, or in admixture with one another, so that a polymer having the hardness dictated by the requirements of a particular use in obtained.

As $\alpha,\beta$-olefinically unsaturated polymerizable mono- and di-carboxylic acids, acrylic acid, methacrylic acid, and itaconic acid are preferred. However, other such unsaturated acids, such as maleic or fumaric acid, may also be employed alone, in combination with each other, or in combination with the aforementioned acids.

In general, the monomer mixture which is to be polymerized solely comprises the aforementioned polymerizable esters and carboxylic acids. However, in certain cases it may be desired to impart to a copolymer properties required by a particular use by the inclusion in the polymer of other further vinyl or vinylidene comonomers. Such comonomers, however, comprise less than 10 percent by weight of the total monomer mixture. For example, by the inclusion of a few percent of N-methylol acrylamide, N-methylol methacrylamide, or of ethers of these methylol compounds, dispersions are obtained which can be used to produce films which are cross-linkable on heating. The addition of hydroxyalkylacrylates or hydroxyalkylmethacrylates, or of acrylamide or methacrylamide, favors the cross-linking reaction. Acrylonitrile and methacrylonitrile, when present as comonomers, increase the resistance to non-polar solvents of films formed from the resulting dispersions. To effect such or similar changes in properties, other monomers such as styrene, vinyl toluene, vinyl imidazole, vinyl pyrrolidone, vinylidene chloride, and the like can also be employed in amounts up to 10 percent by weight of the total monomer mixture, as disclosed earlier herein.

The unsaturated carboxylic acid may not be mixed uniformly with the total amount of the other monomers. According to the invention, the acid is added to the polymerization mixture during a certain limited portion or segment of the process. The effect brought about by this step is most noticeable if the total amount of carboxylic acid monomer is uniformly added during a certain portion or time segment of the process. However, in an alternative embodiment, only a part — but at least 70 percent by weight — of the unsaturated carboxylic acid may be added during a given time segment of the process: the balance of the acid must be introduced in some other way. For example, this balance can be mixed with the other non-acid monomers or may be introduced into the reaction vessel before the addition of the other monomers. As a rule, an unsatisfactory result is obtained if this balance of the acid is first added toward the end of the polymerization.

The portion of the acid, if any, which is not added with the principal amount of unsaturated carboxylic acid can be at most 30 percent by weight of the total amount of carboxylic acid. Preferably, however, it is less than 20 percent and with special advantage is kept less than 10 percent. Evidently, the smaller this amount is, the closer will this alternative embodiment resemble the embodiment in with all of the acid monomers are added during a particular single stage of the process.

According to the invention, the principle amount of the unsaturated carboxylic acid, i.e., at least 70 percent thereof, is added to the polymerization vessel in an amount which is from 3 to 15 percent by weight of the total amount, including the acid, of monomers concurrently added. This results in the formation, during this portion of the process, of polymer portions relatively rich in carboxy groups, which fact is of considerable importance to the properties of the dispersion. The product properties are the more desirable the earlier the addition of the unsaturated carboxylic acid is begun and the shorter the duration of this portion of the process, i.e., the greater the fraction of carboxylic acid in the monomer mixture added during this portion of the process. The last-mentioned measure also advantageously affects the shear stability.

The greater the overall concentration of carboxylic acid is chosen within the range of from 0.5 – 2.5 percent by weight, the longer is the period of time over which the carboxylic acid must be added. It is advantageous to add the carboxylic acid from the beginning of the polymerization and to add no more carboxylic acid during as long a period as possible extending to the end of the process. If acid addition is not begun at the start of the polymerization, then the rate of addition of the carboxylic acid is chosen such that at least the last ten percent by weight of the remaining non-acid monomer is added after the last addition of carboxylic acid. It is still better when the last 30 percent of the monomer mixture is added without the addition of acid.

If addition of the acid is first begun when more than half of the non-acid monomer component is already present in the polymerization batch, then dispersions having a viscosity which is only slightly dependent on pH are no longer obtained. Preferably, acid addition should be begun before not more than 20 percent of the non-acid monomer component is present in the polymerization vessel.

By variation of the amount of carboxylic acid within the range of 0.5 to 2.5 percent by weight, the properties of the dispersion can still be altered to meet various technical requirements. The greater the amount of carboxylic acid, the greater is the shear stability and the viscosity of the dispersion. However, the pH dependence of the viscosity increases. With a carboxylic acid fraction of from 0.5 to 1.5 percent, practically any viscosity desired for technical uses can be attained. Those dispersions whose viscosity, at a 50 percent solids content and at pH values of from 9.5 to 10, are between 5,000 and 30,000 centipoises are, in general, particularly adaptable to technical uses.

Emulsion polymerization is preferably carried out using a continuous addition process. In such a process, a small amount of water is present in a polymerization vessel together with an emulsifying agent and a polymerization initiator. The monomer mixture, which is emulsified in a larger amount of water, is gradually added to the vessel under polymerizing conditions. Alternatively, the total amount of water may be present in the vessel and the monomers may be gradually introduced thereinto in pure (bulk) form. However, the polymerization can also be carried out in the form of a multi-stage process in which water and monomer are introduced into the polymerization vessel portionwise and are emulsified by stirring, whereupon polymerization is then permitted to proceed. After polymerization has subsided, another portion of the monomers is added and the process described above is repeated.

In each of the aforementioned methods, it has proved suitable to introduce the carboxylic acid from a special container. The acid may be optionally dissolved in water or in a small amount of the remaining monomers. In this way, the principal amount of the monomers can be added to the polymerization vessel continuously, or intermittently, over the entire time period required for the process while the carboxylic acid can be added continuously as desired. "Concurrent" addition of the acid and non-acid monomers does not mean their simultaneous addition. In lieu of this it is, of course, also possible to add two different monomer mixtures, one of which contains the carboxylic acid (or at least 70 percent of the total amount of carboxylic acid) and the other of which contains either none or the remainder of the carboxylic acid. In this case, the mixture containing the carboxylic acid is added first to the polymerization batch and then the monomer portion which is free of carboxylic acid (or poor in carboxylic acid) is added.

The polymerization takes place in known fashion at temperatures from, for example, 20°C. – 90°C. under the influence of a free radical-forming initiator such as potassium persulfate, ammonium persulfate, hydrogen peroxide, or the like, or in the presence of a redox system. The pH value is generally between 2 and 9. Further, an anionic emulsifier can be present in an amount of at least 0.1 percent by weight of the water phase.

However, the properties of the dispersions which render them particularly useful for technical purposes are first imparted thereto by the presence of a non-ionic emulsifier. Such an emulsifier can be added during the polymerization but the addition must be such that the formation of new particles is avoided, i.e., the critical concentration for micelle formation should not be exceeded.

One embodiment of the invention involves adding a non-ionic emulsifier only after conclusion of the polymerization. However, the polymerization can be carried out in the exclusive presence of non-ionic emulsifiers. If a non-ionic emulsifier is added after polymerization, preferably in an amount of from 3 – 6 percent by weight of the aqueous phase, the pH value of the dispersion is preferably above 7 to avoid a risk of coagulation. However, the pH is not critical since small amounts of coagulate which may form can be readily removed by filtration.

If polymerization is in the presence of an anionic emulsifier, the materials conventional for emulsion polymerization may be used, for example, alkali metal salts of fatty, rosin, and naphthenic acids or any of a variety of synthetic surface active agents such as alkylated benzene sulfonates, condensed naphthalene-formaldehyde sulfonates, or salts or alkyl aryl polyester sulfates. These anionic materials are well known in the art and their choice is not critical to the present invention.

Similarly, the nature of the non-ionic emulsifier which may be present during the polymerization (instead of an anionic material) is not critical, and the materials conventionally used in emulsion polymerization are suitable. These include, for example, polyalkylene oxide esters of fatty acids such as palmitic or stearic acid, alkyl aryl polyether alcohols, and the like.

As the further non-ionic emulsifier added during or after polymerization, alkylene oxide adducts formed by oxyalkylation of a hydrophobic group are preferred. Such a hydrophobic group may be aromatic, aliphatic, or mixed aliphatic-aromatic and preferably has at least 8 carbon atoms, which imparts hydrophobicity. Such groups include the alkyl phenols, fatty acids, and fatty alcohols, but numerous other hydrophobic groups are present in conventional oxyalkylated non-ionic emulsifiers. Preferably the adducts formed with such hydrophobic groups comprise at least about 20 oxyalkyl groups, e.g., oxyethylene or oxypropylene groups, advantageously they comprise 50 – 100 of such groups. Other hydrophobic groups, e.g., saccharide groups, may be interposed between a hydrophobic group and the oxyalkyl chain. Numerous materials of this kind are well known, are commercially available, and are widely used in emulsion technology.

When the non-ionic emulsifiers are added, the viscosity of dispersions increases noticeably; this increase is greater the shorter the period of time over which the carboxylic acid has been added.

Dispersions which have the composition most useful from the point of view of technical employability, i.e., which comprise from 0.5 – 1.5 parts by weight of methacrylic acid units and 100 parts by weight of units of methyl methacrylate and of butyl acrylate in a weight ratio between 65:35 and 35:65, are most advantageously made by continuous addition emulsion polymerization process in which the methacrylic acid is added to the polymerization batch concurrently with the first 20 – 40 percent by weight of the other monomers. Addition of a non-ionic emulsifier after conclusion of the polymerization has proved suitable in the preparation of dispersions of this type.

The dispersions of the invention are advantageously prepared and marketed with a solids content of from 40 – 60 percent, preferably about 50 percent. They have good freeze-thaw stability and stability to electrolytes. Their preferred field of use is in the preparation of the so-called synthetic resin plasters and for paints. In both fields of use, the high shear stability of the dispersions, the relatively small dependence of their viscosity on pH value, and their stability to the addition of electrolytes is of great significance. For example the dispersions can be combined with very large amounts of fillers and pigments without risk of the formation of coagulate. Paints prepared in this manner possess the high resistance to weathering and aging which is typical of acrylic resin coatings. Highly filled paints, employed as indoor finishes are characterized by an outstanding wet scour resistance.

Typical embodiments of the process of the invention are described in the following Examples. The test methods employed to determine viscosity, freeze-thaw stability, electrolyte stability, and the stirring stability of the dispersions, as well as to determine the wet scour resistance of coatings obtained with pigmented dispersions, are described before the Examples.

Determination of Electrolyte Stability 5 ml of a 20 percent aqueous $CaCl_2$ solution are combined in a watch glass with 5 ml of the dispersion to be tested and are thoroughly mixed. If, after a one hour's warming at 60°C neither thickening nor coagulation of the dispersion is observed, the dispersion is characterized as resistant to electrolytes.

Determination of Freeze-Thaw Stability

A 100 ml wide mouthed flask (polyethylene) is filled to the brim with a sample of the dispersion to be tested. The sample is then frozen 5 times, each freezing being for a period of 15 hours at a temperature of −15°C. After each freezing, the sample is thawed by standing for nine hours at room temperature.

The dispersion is characterized as freeze-thaw stable if it survives these five freeze-thaw cycles without coagulation or noticeable change in viscosity.

Viscosity Measurement

The viscosities for the dispersions given in the following examples were measured in a Brookfield viscosimeter (Model LVT). In each case, the spindle number and the rate of revolution of the spindle are given parenthetically after the viscosity measurement.

Test for Stability to Stirring

Method A

A paste comprising:
162 g of the resin dispersion to be tested (about 50 percent solids);
16 g of an 8 percent ammonia solution of a 30:70 methacrylic acid ethyl acrylate copolymer ("Rohagit SD 15");
16 g of distilled water; and
16 g of a film forming agent (e.g. "Shellsol A") is mixed with
1200 g of marble chips in a laboratory model mortar mixer and stirred at 140 rpm.

The stability to stirring is characterized as that time in which the mosaic plaster mass so obtained neither falls apart nor balls together to form a single coherent clump.

Method B

The test is the same as in Method A, but with the substitution of a paste of the following composition:
158 g of the resin dispersion to be tested (about 50 percent solids);
16 g of an 8 percent ammonia solution of a 30:70 methacrylic acid ethyl acrylate copolymer ("Rohagit SD 15");
16 g of distilled water;
16 g of a film-forming agent (e.g. "Shellsol A"); and
4 g of finely divided silica gel (e.g. "Aerosil").

Determination of Wet Scour Resistance

For determination of wet scour resistance, white, highly-filled paints having a pigment volume concentration of 83 percent (= PVC 83) are prepared.

The preparation of the paint and the determination of wet scour resistance are according to the conditions recommended by the "Technischen Arbeitskreis Dispersionsfarben" (TAKD). The measure of wet scour resistance given is the number of scouring strokes.

EXAMPLE 1

0.50 g of ammonium peroxy disulfate and 0.65 g of a commercial emulsifier which is the reaction product of triisobutylphenol with 7 mols of ethylene oxide, subsequently sulfated and converted into the sodium salt, are dissolved at 80°C. in 400 g of distilled water in a two liter vessel equipped with a condenser, stirring apparatus, and feed tank. Over a period of eight minutes, an emulsion priorly prepared from 16.5 g of methyl methacrylate, 16.7 g of butyl acrylate, 5 g of methacrylic acid, 0.062 g of the aforementioned emulsifier, 0.05 g of the aforementioned initiator, and 20 g of distilled water, is added dropwise to the solution at 80°C. with stirring. Subsequently, an emulsion comprising 478.5 g of methyl methacrylate, 483.3 g of butyl acrylate, 1.788 g of the aforementioned emulsifier, 1.45 g of the aforementioned initiator, and 550 g of distilled water is added at 80°C. over a period of 232 minutes. After everything has been added, the pH is adjusted to 7.5 with aqueous ammonia. The batch is held at 80°C for two hours and then cooled to 50°C. At this point, 50 g of the reaction product of 1 mol of isononylphenol with 100 mols of ethylene oxide (diluted with a threefold amount of water) is added. After cooling to about 25°C., the batch is adjusted to a pH of 9.5 – 10 with aqueous ammonia.

A dispersion free of coagulate and stable to electrolytes and freezing and thawing is obtained. The solids content is 48.5 percent. The viscosity at pH 9.5 is 20,000 centipoises (IV/6) and, at pH 10, 25,000 centipoises (IV/6). The stability to stirring, tested according to Method B, is about 70 minutes. The wet scour resistance at PVC 83 is about 2500 double strokes.

EXAMPLE 2

0.50 g of ammonium peroxy disulfate and 0.25 g of the emulsifier used in Example 1 are dissolved at 80°C. in 400 g of distilled water in a two-liter reaction vessel equipped with a condenser, stirrer, and feed tank. An emulsion previously prepared from 437 g of methyl methacrylate, 375 g of butyl acrylate, 25 g of methacrylic acid, 1.875 g of the aforementioned emulsifier, 1.25 g of the aforementioned initiator, and 472.5 g of distilled water is dropped at 80°C. with stirring into the aforementioned solution over a period of 200 minutes. Subsequently, an emulsion comprising 88 g of methylmethacrylate, 75 g of butyl acrylate, 0.375 g of the aforementioned emulsifier, 0.25 g of the aforementioned initiator, and 80 g of distilled water, is added at 80°C. over a period of 40 minutes. Thereafter, the pH is adjusted at 7.5 with aqueous ammonia. The batch is held for a further two hours at 80°C. and then cooled to 50°C. Then 50 g of the reaction product of 1 mol of isononylphenol with 200 mols of ethylene oxide (diluted with a threefold amount of water) are added and, after cooling to 25°C., the mixture is adjusted to a pH of 9.5 with aqueous ammonia.

A coagulate-free, electrolyte-stable and freeze-thaw stable dispersion having a solids content of 49.0 percent and a viscosity of 30000 centipoises (IV/6) is obtained. The stability of this dispersion to stirring, determined according to Method B, is about 95 minutes.

Comparison with Example 2

Example 2 is repeated with the difference that the total amount of methacrylic acid is emulsified with the other monomers and the emulsion is introduced into the reaction vessel over a period of four hours.

The resulting 48 percent dispersion is electrolytestable and has a viscosity of 10000 centipoises (III/6) at a pH of 9.5. The dispersion, however, is only stable to stirring for about 35 minutes (Method B).

EXAMPLE 3

1.25 g of ammonium peroxy disulfate and 1.65 g of the commercial emulsifier of Example 1 are dissolved at 80°C. in 1000 grams of distilled water in a five-liter vessel equipped with a condenser, stirring apparatus, and feed tank. An emulsion priorly prepared from 1,325 g of methyl methacrylate, 1,125 g of butyl acrylate, 4.625 g of the aforementioned emulsifier, 3.75 g of ammonium peroxy disulfate, and 1000 g of distilled water is added dropwise to the solution at 80°C. with stirring over a period of four hours. During the first hour in which the emulsion is added, a separate solution of 50 g of itaconic acid in 450 g of distilled water is also added. After all additions have been completed, the mixture is adjusted to a pH of 7.5 with aqueous ammonia. The batch is maintained for two hours at 80°C. and then cooled to 25°C. After the addition of 125 g of the reaction product of 1 mol of isononylphenol with 100 mols of ethylene oxide (diluted with a three-fold amount of water), the pH of the batch is adjusted to 9.5 – 10 with aqueous ammonia.

A coagulate-free, electrolyte-stable, and freeze-thaw stable dispersion having a solids content of 48.2 percent is obtained. The viscosity of the dispersion is 8000 centipoises (III/6) at a pH of 9.5 and is 11000 centipoises (III/6) at a pH of 10.

The dispersion is stable to stirring for about 75 minutes (Method B).

EXAMPLE 4

0.020 kg of ammonium peroxy disulfate and 0.02 kg of a commercial emulsifier comprising the reaction product of triisobutylphenol and 7 mols of ethylene oxide, subsequently sulfated and neutralized, are dissolved in 16 kg of distilled water present in a stainless steel reaction vessel of 100-liter capacity, equipped with a condenser, stirrer, and feed tank. An emulsion previously prepared from 7.65 kg of methylmethacrylate, 7.2 kg of butyl acrylate, 0.03 kg of the aforementioned emulsifier, 0.0225 kg of ammonium peroxy disulfate, and 9.0 kg of distilled water is added to the solution dropwise at 80°C. with stirring over a period of 1½ hours. Subsequently, an emulsion comprising 5.1 kg of methyl methacrylate, 4.8 kg of butyl acrylate, 0.4 kg of methacrylic acid. 0.02 kg of the aforementioned emulsifier, 0.015 kg of ammonium peroxy disulfate, and 5 kg of distilled water is added over a further period of an hour. Within the next following hour and one-half, an emulsion comprising 7.65 kg of methyl methacrylate, 7.2 kg of butyl acrylate, 0.03 kg of the aforementioned emulsifier, 0.0225 kg of ammonium peroxy disulfate, and 8 kg of distilled water is added at 80°C. After all the additions have been completed the pH is adjusted to 7.5 with aqueous ammonia. The batch is held for two hours at 80°C. and then cooled to 25°C. Thereupon 2 kg of the reaction product of 1 mol of isononylphenol with 100 moles of ethylene oxide (diluted with a three-fold amount of water) are added. The pH of the batch is adjusted to 9.7 with aqueous ammonia.

A coagulate-free, electrolyte-stable, freeze-thaw-stable dispersion having a solids content of 49 percent and a viscosity of 5000 centipoises (III/6) is obtained.

Its stability to stirring is about 120 minutes (Method A) or about 75 minutes (Method B) Wet scour resistance at PVC 83 is about 2500 double strokes.

Comparison with Example 4

Example 4 is repeated with the exception that the total amount of methacrylic acid is introduced into the reaction vessel with the other monomers over a period of four hours.

A coagulate-free, electrolyte-stable, but not freeze-thaw-stable dispersion having a solids content of 49.6 and a viscosity of 2000 centipoises (II/6) at a pH of 9.5 is obtained.

The dispersion is only stable to stirring for about 35 minutes (Method A) or for about 20 minutes (Method B).

EXAMPLE 5

0.50 g of ammonium peroxy disulfate, 0.75 g of the sodium salt of a $C_{15}$-paraffin sulfonate, and 2.0 g of methacrylic acid are dissolved at 80°C. in 400 g of distilled water in a two-liter vessel equipped with a condenser, stirrer, and feed tank. A previously-prepared emulsion comprising 202.5 g of methyl methacrylate, 169 g of butyl acrylate, 8 g of methacrylic acid, 1.6 g of the aforementioned emulsifier, 0.56 g of the aforementioned initiator, and 210 g of distilled water is added dropwise to the solution, with stirring, at 80°C over the course of 1½ hours. Subsequently, an emulsion comprising 337.5 g of methyl methacrylate, 281 g of butyl acrylate, 2.65 of the aforementioned emulsifier, 0.94 g of the aforementioned initiator, and 340 g of distilled water is added at 80°C. over 150 minutes. At this point, the pH of the batch is adjusted to 7.5 with aqueous ammonia. The batch is held for 2 hours at 80°C. and then cooled to 50°C. Subsequently, 50 g of the reaction product of 1 mol of isononylphenol with 20 mols of ethylene oxide (diluted with a threefold amount of water) is added. After cooling to 25°C. the pH is adjusted to 9.5 with aqueous ammonia.

A coagulate-free, electrolyte-stable, and freeze-thaw-stable dispersion having a solids content of 49.0 percent and a viscosity, at a pH of 9.5, of 16000 centipoises (III/6) is obtained.

The dispersion is stable to stirring for about 65 minutes (Method B).

EXAMPLE 6

0.5 g of ammonium peroxy disulfate and 1.0 g of sodium dodecyl sulfate are dissolved at 80°C. in 400 g of distilled water in a two-liter reaction vessel equipped with a condenser, stirring apparatus, and feed tank. A previously-prepared emulsion comprising 85 g of methyl methacrylate, 87,5 g of butyl acrylate, 75 g of butyl methacrylate 10 g of acrylic acid, 1.0 g of sodium dodecyl sulfate, 0.375 g of ammonium peroxy disulfate, and 150 g of distilled water is added dropwise with stirring at 80°C. over a period of an hour. Subsequently, an emulsion comprising 255 g of methyl methacrylate, 262.5 g of butyl acrylate, 225 g of n-butyl methacrylate, 3.0 g of sodium dodecylsulfate, 1.125 g of ammonium peroxy disulfate, and 400 g of distilled water is added over a period of 3 hours. The pH of the mixture is then adjusted to 7.5 with aqueous ammonia. The batch is maintained for two hours at 80°C. and then cooled to 25°C. At this point, 50 g of the reaction product of 1 mol of isononylphenol with 20 moles of ethylene oxide (diluted with a three-fold amount of water) are added and the pH of the batch is adjusted to 9.5 – 10 with aqueous ammonia.

A coagulate-free, electrolyte-stable, and freeze-thaw-stable dispersion with a solids content of 49.0 percent and a viscosity, at a pH of 9.5 – 10, of 5000 centipoises (III/6) is obtained.

The dispersion is stable to stirring for longer than 120 minutes (Method A).

EXAMPLE 7

0.9 g of the commercial anionic emulsifier employed in Example 1, 150 g of methyl methacrylate, 147 g of butyl acrylate, and 9 g of methacrylic acid are emulsified in 825 g of distilled water in a two-liter polymerization vessel equipped with a reflux condenser and stirrer. Polymerization is initiated, with the exclusion of atmospheric oxygen, with 0.3 g of ammonium peroxy disulfate, 0.42 g of sodium pyrosulfite, and 0.009 g of iron (II) sulfate. After the polymerization has subsided, the batch is cooled to about 30°C. and 0.675 g of the aforementioned emulsifier, 150 g of methyl methacrylate, and 147 g of butyl acrylate are emulsified therein. After removal of atmospheric oxygen, polymerization is re-initiated by the addition of 0.3 g of ammonium peroxy disulfate and 0.42 g of sodium pyrosulfite. After the polymerization has once again subsided, the batch is cooled to 30°C. and a third monomer mixture comprising 0.675 g of the aforementioned emulsifier, 150 g of methyl methacrylate, and 147 g of butyl acrylate is emulsified and polymerization is induced with 0.3 g of ammonium peroxy disulfate and 0.42 g of sodium pyrosulfite. After the temperature maximum is reached and passed, the batch is cooled to 30°C. and the pH is adjusted to 7.5 with aqueous ammonia. 45 g of the reaction product of 1 mol of isononylphenol with 100 mols of ethylene oxide (diluted with a threefold amount of water) are added to the dispersion and the pH of the batch is adjusted with aqueous ammonia to 9.5 – 10.

A coagulate-free, electrolyte-stable dispersion with a solids content of 49.5 percent and a viscosity of 2000 centipoises (II/6) at a pH of 9.5 is obtained.

The dispersion is stable to stirring for longer than 120 minutes (Method A) and for about 90 minutes (Method B).

EXAMPLE 8

0.25 g of ammonium peroxy disulfate and 0.25 g of sodium dodecyl sulfate are dissolved at 80°C. in 200 g of distilled water in a two-liter vessel equipped with a condenser, stirrer, and feed tank. A previously-prepared mixture comprising 56.3 g of methyl methacrylate, 56.3 g of butyl acrylate, 11.25 g of styrene, and 5 g of acrylic acid is added dropwise to the solution at 80°C. with stirring over a period of an hour. Subsequently, a monomer mixture comprising 168.7 g of methyl methacrylate, 168.7 g of butyl acrylate, and 33.75 g of styrene is added over a period of three hours. 1 g of sodium dodecyl sulfate and 0.75 g of the aforementioned initiator, dissolved in 251 g of distilled water, are added from a separate vessel. The batch is then held for 2 hours at 80°C. and cooled to 25°C. Subsequently, 25 g of the reaction product of 1 mol of isononylphenol with 200 mols of ethylene oxide (diluted with a threefold amount of water) are added. After adjustment of the pH value to 9.5 – 10 with aqueous ammonia, and electrolyte-stable and freeze-thaw-stable dispersion having a solids content of 49.5 percent and a viscosity of 29000 centipoises (IV/6) at a pH of 9.5 is obtained.

The dispersion is stable to stirring for about 90 minutes (Method A).

EXAMPLE 9

0.2 g of ammonium peroxy disulfate and 1.0 g of the reaction product of 1 mol of isononylphenol with 100 mols of ethylene oxide are dissolved in 100 g of distilled water at 80°C. in a two-liter vessel equipped with a reflux condenser and feed tank. A previously-prepared emulsion comprising 81.7 g of methyl methylacrylate, 67.4 g of butyl acrylate, 3 g of methacrylic acid, 4.74 g of the aforementioned non-ionic emulsifier, 0.15 g of ammonium peroxy disulfate, and 74.2 g of distilled water is added dropwise to this mixture at 80°C. with stirring over a period of an hour. Subsequently, an emulsion comprising 245.3 g of methyl methacrylate, 202.6 g of butyl acrylate, 14.26 g of the aforementioned emulsifier, 0.45 g of the aforementioned initiator, and 250 g of distilled water is added over a period of three hours. After everything has been added, the batch is held at 80°C. for two hours and then cooled to 25°C. It is then adjusted to a pH of 9.5 – 10 with aqueous ammonia.

An electrolyte-stable dispersion having a solids content of 59.4 percent is obtained, the viscosity of which is 9000 centipoises (III/6) at a pH of 9.5 and is 8000 centipoises (III/6) at a pH of 10.

The dispersion is stable to stirring for more than 120 minutes (Method A) or for about 85 minutes (Method B).

EXAMPLE 10

0.50 g of ammonium peroxy disulfate and 0.65 g of the commercial anionic emulsifier of Example 1 are dissolved at 80°C. in 400 g of distilled water in a two-liter vessel equipped with a reflux condenser, stirrer, and feed tank.

A previously-prepared emulsion comprising 146.3 g of methyl methacrylate, 100 g of 2-ethyl hexylacrylate, 15 g of methacrylic acid, 0.463 g of the aforementioned emulsifier, 0.375 g of the aforementioned initiator, and 151 g of distilled water is added dropwise to the solution at 80°C. with stirring over a period of an hour. In the following three hours, an emulsion comprising 438.7 g of methyl methacrylate, 300 g of 2-ethyl hexylacrylate, 1.387 g of the aforementioned emulsifier, 1.125 g of the aforementioned initiator, and 400 g of distilled water is added dropwise at 80°C. After everything has been added, the pH is adjusted to 7.5 with aqueous ammonia. The batch is held for two hours at 80°C. and then cooled to 50°C. At this point, 50 g of an adduct formed between a $C_{16}-C_{18}$-fatty alcohol and 80 mols of ethylene oxide (diluted with a threefold amount of water) are added. After cooling to about 25°C., the pH of the mixture is adjusted to 9.7 with aqueous ammonia.

A coagulate-free, electrolyte-stable, and freeze-thaw-stable dispersion having a solids content of 49 percent and a viscosity of 10000 centipoises (III/6) is obtained. The stability of the dispersion to stirring, measured according to Method A, is about 120 minutes.

EXAMPLE 11

0.49 g of ammonium peroxy disulfate and 0.637 g of the commerical emulsifier mentioned in Example 1 are dissolved in 400 g of distilled water in a two-liter vessel equipped with a reflux condenser, stirrer, and feed tank. A previously-prepared emulsion comprising 96.5 g of methyl methacrylate, 153 g of ethyl acrylate, 8.0 g of methacrylic acid, 2.5 g of N-methylol methacrylamide, 0.453 g of the aforementioned emulsifier, 0.37 g of the aforementioned initiator, and 151.0 g of distilled water is introduced into the solution at 80°C. with stirring over the course of an hour. In the following three hours, an emulsion comprising 291.1 g of methyl methacrylate, 459 g of ethyl acrylate, 2.2 g of methacrylic acid, 7.7 g of N-methylol methacrylamide, 1.36 g of the aforementioned emulsifier, 1.1 g of the aforementioned initiator, and 415 g of distilled water is added at 80°C. After half of the total monomers has been added, 50 g of the reaction product of 1 mol of isononylphenol with 100 mols of ethylene oxide (diluted with a threefold amount of water) are added. The batch, after the addition of all the monomers, is held for an additional two hours at 80°C. and, after cooling to 25°C., is adjusted to a pH of 9.5-10 with aqueous sodium hydroxide.

A coagulate-free, electrolyte-stable dispersion having a solids content of 47.5 percent and a viscosity of 5000 centipoises (III/6) at a pH of 9.5 is obtained.

The dispersion is stable to stirring for about 90 minutes (Method A).

What is claimed is:

1. In a method for preparing a synthetic resin dispersion by the free-radical aqueous emulsion copolymerization, in the presence of an anionic or non-ionic emulsifier, of an alkyl ester of acrylic acid or of methacrylic acid and an $\alpha,\beta$-olefinically unsaturated mono- or di-carboxylic acid, said copolymer being formed from
   1. 90 to 100 percent of monomers comprising
      a. 87.5 to 99.5 percent of at least one alkyl ester of acrylic acid or of methacrylic acid;
      b. 2.5 to 0.5 percent of at least one $\alpha,\beta$-ethylenically unsaturated mono- or di-carboxylic acid; and
   2. 0 to 10 percent of at least one other vinyl or vinylidene monomer copolymerizable therewith, each of said percentages being by weight of the total mixture of monomers to be polymerized;
   the improvement wherein
   A. at least 70 percent by weight of the total unsaturated carboxylic acid employed is added to the polymerization in amounts between 3 percent and 15 percent by weight of all monomers, including the carboxylic acid, being concurrently added;
   B. the addition of acid according to (A) is begun before the polymerization of more than 50 percent by weight of the total monomers (1)(a) and (2) has been initiated and is concluded before the polymerization of more than 90 percent by weight of the total monomers (1)(a) and (2) has been initiated; and 3 to 6 percent, by weight of the aqueous phase, of a further non-ionic emulsifier are added during or after the copolymerization of said monomers.

2. The method as in claim 1 wherein said further non-ionic emulsifier is added during the course of copolymerization of said monomers.

3. The method as in claim 1 wherein said further non-ionic emulsifier is added after copolymerization of said monomers is completed.

4. The method as in claim 1 wherein said monomers are added in bulk form.

* * * * *